United States Patent [19]

Jones, Jr.

[11] Patent Number: 5,690,729

[45] Date of Patent: Nov. 25, 1997

[54] CEMENT MIXTURES WITH ALKALI-INTOLERANT MATTER AND METHOD

[75] Inventor: Roger H. Jones, Jr., Reno, Nev.

[73] Assignee: Materials Technology, Limited, Reno, Nev.

[21] Appl. No.: 390,468

[22] Filed: Jan. 27, 1995

Related U.S. Application Data

[63] Continuation-in-part of Ser. No. 309,955, Sep. 21, 1994, abandoned.

[51] Int. Cl.$^6$ .................................................. C04B 22/06
[52] U.S. Cl. ........................ 106/682; 106/738; 106/742; 106/752; 106/817; 106/820; 264/333; 264/43
[58] Field of Search ...................... 106/738, 739, 106/742, 743, 752, 820, 792, 745, 761, 762, 682, 817; 264/DIG. 43, 333, 82, 104, 61

[56] References Cited

U.S. PATENT DOCUMENTS

| | | | |
|---|---|---|---|
| 4,069,063 | 1/1978 | Ball | 195/713 |
| 5,043,020 | 8/1991 | Lerke et al. | 106/750 |
| 5,307,876 | 5/1994 | Cavan | 106/790 |
| 5,358,676 | 10/1994 | Jennings et al. | 264/104 |

FOREIGN PATENT DOCUMENTS

| | | |
|---|---|---|
| 0181261 | 5/1986 | European Pat. Off. |
| 2409217 | 9/1975 | Germany |
| 3017631 | 2/1978 | Japan |
| 3094516 | 8/1978 | Japan |
| 7071847 | 5/1982 | Japan |
| 9000564 | 1/1990 | Rep. of Korea |

OTHER PUBLICATIONS

*Concrete Technology and Practice* Taylor (1965) pp. 439–441.

Japan Patent Abstract—"Production of High Strength Cured Cement Material Utilizing Carbonation Reaction" Suzuki et al. JP 06–263562 (Sep. 20, 1994).

Japan Patent Abstract "Production of High Oil Resistant Cement Hardened Body" Suzuki et al. JP 06–10749 (Apr. 19, 1994).

Japan Patent Abstract "Mineral Aggregate Resistant to Reacton with Base & Method for Suppressing Base–Aggregate Reacton" Tsuyuki et al. JP 04–74740 (Mar. 10, 1992).

"Environmental Protection for Concrete", Stanfield *Pigment & Resin Technology* (United Kingdom) (1987) 16, (10) 8–13 See Abstract.

"Study of the Endogeneous Carbonation of Concrete and of its Application to the Precast Concrete Industry" Estoup et al. Thesis—Univ. of Paris (1987)—See Abstract—.

(List continued on next page.)

*Primary Examiner*—Paul Macantoni
*Attorney, Agent, or Firm*—Townsend and Townsend and Crew

[57] ABSTRACT

A method of reinforcing cement/concrete mixtures with alkali-intolerant reinforcements and/or aggregate, such as uncoated, common glass filament, plastic filament, fabric and roving made therefrom by reducing the pH of the mixture while in its plastic state, and/or after it has set and cured, to about 7. With a neutral pH, the alkali-intolerant reinforcements need not be coated to protect them from degradation. In the absence of alkalinity, the reinforcement and/or aggregate material bonds with the cement mixture to form a relatively stronger mixture, which can be shaped as desired, made part of permanently poured structures, cement boards and many other small and large products. By selecting appropriate and, if desired, different materials for the reinforcements and/or aggregate, the strength, flexibility, etc. characteristics of the product can be readily changed to adapt the product to the intended use. The pH is reduced by migrating such materials as $CO_2$ and/or $CO$ and $O_3$ into the cement after it has cured and, if desirable, also during curing. The $CO_2$ and/or $CO$ and $O_3$ for the chemical reactions to reduce the pH are most suitably obtained from flue gases of independent combustion processes which would otherwise be discharged as atmospheric pollutants.

58 Claims, 1 Drawing Sheet

OTHER PUBLICATIONS

"Plasma Treated Ultra High Strength Polyethylene Fibers Improved Fracture Toughness of Polymethymethacrafatic" Hild et al. *J. of Mat'ls Science* V4 N5 (1993).

*Cement and Concrete Research*, Perez–Pena, M., et al. (1994), "Mechanical Properties of Fiber Reinforced Lightweight Concrete Composites", pp. 1121–1132.

*Cement and Concrete Research*, Wang, Shao–Dong, et al. (1994), "Factors Affecting the Strength of Alkali–Activated Slag", pp. 1033–1043.

*Magazine of Concrete Research*, Loo, Y.H., et al. (1994), "A carbonation prediction model for accelerated carbonation testing of concrete", pp. 191–200.

*American Concrete Institute*, Bentur, A. (1990), "Improvement of the Durability of GFRC by Silica Fume Treatments", pp. 215–222, 225–231.

*American Concrete Institute* (1989), "Cold Weather Concreting", pp. 306R–1, 4, 19.

*Concrete Technology and Design*, Swamy, R.N. (1988), "Natural Fibre Reinforced Cement and Concrete", pp. 170–172.

*Prestressed Concrete Institute* (1987), "Recommended Practice for Glass Fiber Reinforced Concrete Panels", Ch. 3, p. 8, Ch. 1, p. 1.

*Manual fo Concrete Practice*, ACI Committee 544 (1986), "State–of–the–Art Report on Fiber Reinforced Concrete", pp. 544.1R–1–22.

*Swedish Cement and Concrete Research Institute*, Gram, H–E (1983), "Durability of natural fibres in concrete", pp. 98–131, 174–181.

*American Concrete Institute*, An International Symposium: Fiber Reinforced Concrete (1974), article entitled "Some Properties of Glass Fiber Reinforced Concrete", pp. 93–111.

*Americna Concrete Institute*, An International Symposium: Fiber Reinforced Concrete (1974), article entitled "Glass Fiber Reinforced Cement Base Materials", pp. 248–264.

*American Concrete Institute*, an International Symposium: Fiber Reinforced Concrete (1974), article entitled "Glass Fiber Reinforned Cement Base Materials", pp. 350–362.

Taylor, W.H. (1965), "Concrete Technology and Practice", pp. 178–180, Ch. 10, p.1.

000
CEMENT MIXTURES WITH ALKALI-INTOLERANT MATTER AND METHOD

RELATED APPLICATIONS

This application is a continuation-in-part application of patent application Ser. No. 08/309,955 filed Sep. 21, 1994, abandoned, for Cement Mixtures With Alkali-Intolerant Particulates.

BACKGROUND OF THE INVENTION

This invention offers a method to permit the combination of portland, lime or pozzolanic hydraulic cement with alkali-sensitive and/or alkali-intolerant matter such as reinforcing or aggregate materials including conventional, untreated glass and/or certain plastics and/or blends of these materials, and/or other more conventional materials, using carbon dioxide gas and/or gaseous mixtures including, for example, carbon monoxide, ozone and/or carbon dioxide—the primary constituents of "greenhouse gas"—and possibly other gases, to reduce or neutralize the alkalis which are present in the cement pastes or cement mixtures and thus prevent the undesirable alkali decomposition or degradation of these and any other potential admixture or reinforcement materials, including both naturally occurring and artificial ones. The present invention also offers a means to increase the strength of the bond between the cement and these materials by reducing or eliminating weaker crystalline structures from the transition phase between them and by filling voids in the transition phase with tightly packed crystals of calcite (calcium carbonate). Because it is a primary objective of this invention, wherever economically feasible, to obtain carbon dioxide used for the alkali-neutralization (carbonation) process described herein from scrubbed flue gases containing, in addition to carbon dioxide, both ozone and carbon monoxide, which can be reacted together to produce oxygen and additional carbon dioxide, this invention will also facilitate the production and manufacture of environmentally beneficial, commercially useful products and materials.

There are many patents and much technical literature proposing the use of glass and glass fibers (fiberglass, including chopped strand, mat, roving and cloth and glass beads, powders and grindings) as reinforcement or aggregate in concretes, cements and mortars. In practice, however, it has been found that alkali-intolerant materials such as normal glass, many high-strength plastics and even certain naturally occurring fibers such as cotton, silk, wool, wood and plant and animal material fibers that might otherwise make excellent reinforcements are attacked by the alkali in portland, lime or pozzolanic hydraulic cement. Alkali reaction causes all or most of normal glass to decompose into silica gel ($SiOH:H_2O$ . . . ), which absorbs moisture and disrupts the cement matrix. Plastics react with alkali in chemically different ways, but the result is still lattice instability or loss of tensile strength in the reinforcement or aggregate.

Current practice to prevent alkali decomposition or degradation of glass is either to use costly, alkali-resistant glass or to coat the glass with materials (such as plastics or resins) which isolate the glass from the cement paste, also an expensive proposition, and one which creates an intermediate boundary layer that inhibits a direct, tight bond between the glass and the cement, concrete or mortar, producing a final product with a strength lower than would be the case if the cement and the glass were bound directly to one another. The only plastics that in common practice are combined with cements are alkali-tolerant, which precludes the use of many higher-strength, alkali-intolerant plastics such as polyesters as reinforcements or aggregates.

Back-scattering and scanning electron photo-micrographs have revealed that around most reinforcing fibers there develops a transition phase separating the fibers and/or aggregates from the hydrated (cured) cement paste. This phase is often full of small voids and frequently includes a substantial amount of unhydrated or incompletely hydrated cement crystals known as portlandite. This material, besides being unstable, is structurally weaker than hydrated cement, thus forming a weaker than optimal bond between the fibers or aggregates and the hydrated cement lattice. If the fibers or aggregates used are alkali-sensitive or intolerant, this transition phase is often further weakened by the presence of a disorganized mass of the aforementioned silica gel. It would be desirable to reduce or eliminate this type of transition phase and to replace it with fully hydrated cement with few voids and little or no gel.

If the pH of the cement paste were neutral, stronger, cement-based composites and concretes of all types and descriptions could be produced using relatively inexpensive, commonly available, uncoated glass, high-strength plastic or naturally occurring fibers, as well as blends of these materials, as reinforcing fibers and/or aggregates. Experiments demonstrate that cement paste alkalinity can be neutralized by converting the hydroxides in the cement paste to calcium carbonate. In portland, lime or pozzolanic cement pastes exposed to a normal atmosphere containing, among other gases, carbon dioxide, and at times trace amounts of carbon monoxide, this process is a slow, natural one. By accelerating this process, neutralization of alkalinity can be expedited, making the reaction commercially valuable for the production of a broad range of desirable, low-cost materials.

Among other products, combustion produces carbon dioxide, carbon monoxide and ozone. The latter two are generally the result of incomplete combustion. Together these gases, known collectively as "greenhouse gases", have been observed to have deleterious effects on the earth's atmosphere. An important side benefit of the cement carbonation process is that it consumes an amount of carbon dioxide equal to the quantity of calcium hydroxide that is present in the hydrated cement paste. Of course, the carbon dioxide used in the process described herein must come from some source and, if that source were largely or in whole the combustion products of power generation or other industrial combustion processes, then there would be the further benefit of keeping these gases out of the atmosphere.

SUMMARY OF THE INVENTION

It is an objective of this invention to expedite the cement carbonation reaction specifically in order to reduce or even neutralize the alkalinity of cement pastes so that the hydroxides will not have a prolonged opportunity to attack matter such as reinforcements or aggregates made of normal glass, plastic or other materials or blends thereof which are susceptible to damage from them. It is also a purpose of this invention to improve the quality of the transition phase between the cement lattice and various fibrous and non-fibrous reinforcements and aggregates by completing curing or hydration, by reducing the opportunity for gels to form, and by filling voids in the transition phase with crystals of calcite.

The process involved, cement carbonation, is well known and documented, but in the past it has not been recognized as being capable of and it has not been employed for preventing alkaline decomposition of glass, plastic, naturally occurring fibers, blends of some or all of these, or other aggregates or reinforcements and admixtures. It has also not been recognized as being useful to complete hydration of portlandite surrounding reinforcements and aggregates. Furthermore, carbonation of cement is generally not considered to be an acceptable practice used by those skilled in the art. This is because most concretes and cements are reinforced by steel which is protected from corrosion by the high pH of portland, lime or pozzolanic hydraulic cements. Finally, the high rate of consumption of carbon dioxide and/or carbon monoxide by the process of the present invention, whether or not derived in whole or in part from industrial flue (greenhouse) gases, significantly helps to prevent these gases from entering the atmosphere as pollutants.

When a material is used as a reinforcement and/or aggregate in materials made with portland, lime, pozzolanic or other appropriate hydraulic cement, the strength and flexibility contributed by that reinforcement and/or aggregate is in direct proportion to the strength of the bond between it and the cement paste. To increase compressive or flexural strength, it is necessary to increase the tenacity of the bond. Controlled cement carbonation integrates the aggregate or reinforcing glass, plastic, natural materials or blends of materials into the cement matrix to form a structurally sound, unimpaired bond between the cement and the aggregates and/or reinforcement. It does this by reducing or eliminating the portlandite in the transition phase surrounding these materials and by filling voids in the cement paste with fine, tightly packed crystals of calcium carbonate. Consequently, the strength is greater than would otherwise be possible using coated glass or weaker, alkali-tolerant plastics. In the past, carbonation has been seen as beneficial in promoting a faster cure or for increasing the strength or outer hardness (in essence, "case-hardening") of the cement or concrete, but not as a means to reduce pH, and thereby the degradation of alkali-intolerant materials, or to reduce or eliminate portlandite in transition phases by promoting further hydration.

It is therefore a further object of this invention to prevent alkaline decomposition or degradation of glass or certain plastics, or other potential admixture materials including naturally occurring materials and fibers and other materials and blends of some or all of the foregoing used in any combination with cured or uncured portland, lime or pozzolanic cement, by lowering the pH of the mixture to about 7. This can be done early on; e.g. during mixing and/or initial setting of the cement and before the cement has fully cured to prevent a possible attack on the alkali-intolerant materials in the time interval between the batching and the initial set. However, and especially during the first up to 28 days of curing of the cement, hydroxides; e.g. calcium hydroxide, will continue to be generated as part of the ongoing hydration process so that, with the passage of time, the pH of the cement again will rise. Accordingly, it will be advantageous, and often necessary, to carbonate or re-carbonate the cement following hydration to assure that the pH of the final product remains at about 7.

It is a purpose of this invention to reduce or neutralize the pH of cured or uncured cement pastes in any combination with glass or plastics or any other alkali-sensitive or alkali-intolerant admixture materials.

A still further objective of this invention is to reduce or eliminate the portlandite in the transition phase between cement paste and glass or certain plastics or other potential admixture materials including naturally occurring materials and fibers and other materials and blends of some or all of the foregoing used in any combination with cured or uncured portland, lime or pozzolanic cement.

In many industrial flue gases such as those produced by electrical power plants, along with carbon dioxide ($CO_2$), carbon monoxide (CO) and ozone ($O_3$) are also present. Although carbonation will proceed, though more slowly, if cement is exposed to carbon monoxide, the process is significantly faster and more effective if the primary reagent is carbon dioxide. Since ozone is a strong oxidizer, it is easily reacted with the carbon monoxide to produce molecular oxygen ($O_2$) and carbon dioxide. Separating these latter two gases is easy and the carbon dioxide can be retained and used for carbonation as described herein, while the pure oxygen may be safely released into the atmosphere or, if desired, returned to the combustion chamber where it may be utilized to promote more complete combustion. This has the added advantage that the so-called greenhouse gas; e.g. the effluent from industrial stacks from which particulates and any hazardous materials have been scrubbed, can be used as an inexpensive source for the material needed to neutralize the hydroxides. In such instances, the carbon dioxide produced from these greenhouse gases is preferably compressed, liquefied and cooled or frozen for storage and transportation before it is used to carbonate cement.

DESCRIPTION OF THE PREFERRED EMBODIMENT

Figure 1:
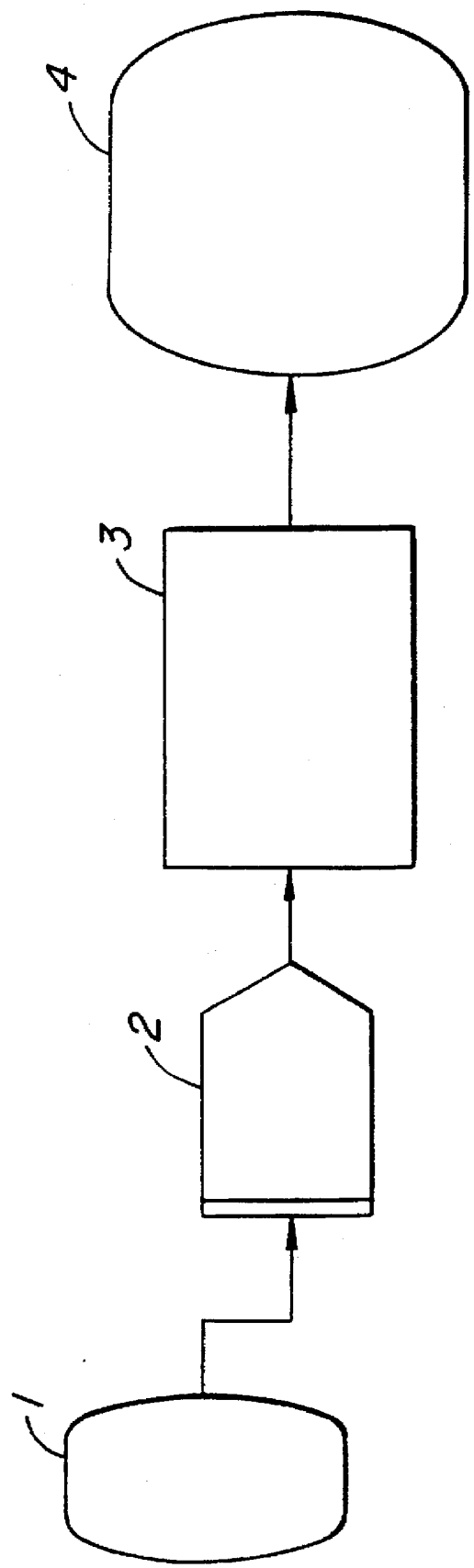
FIG. 1 is a process flow diagram illustrating one embodiment of the invention to produce a carbonated, cement and glass, plastic or other admixture product for casting or molding.

The present invention uses carbonated cement with its pH converted to neutral as a binder for glass and/or certain plastic and/or naturally occurring aggregates and fibers, cloth, roving and/or aggregates to be used in many applications and materials now made of such things as natural-fiber, plastic-fiber or fiberglass reinforced polymers and to replace coated or alkali-resistant glass used to make products like fiberglass reinforced cement board. As shown in FIG. 1, the cement may be carbonated during any or all of the batching process, 1, casting or molding, 2, while drying or autoclaving, 3, and/or by immersion, 4. As is further discussed below, to assure that the pH of the fully cured product remains at 7, it is presently necessary to carbonate or re-carbonate the product after completion of cement hydration (curing).

An alternative means of carbonation is to increase the amount of carbon dioxide, carbon monoxide and/or ozone, for example, used as a foam-blowing agent to make foamed cements and concretes. In this method, instead of using only compressed air as the blowing agent for the preformed aqueous foams typically used, compressed carbon dioxide gas replaces all or some of the compressed air and may also be combined with other gases selected and proportioned to promote specific chemical reactions with the cement paste. The greater the content of compressed carbon dioxide gas in the compressed gas mixture used to blow the foam, the more rapid and complete the carbonation of the cement paste. Finally, carbon dioxide or a mixture of carbon dioxide and other gases may simply be entrained into the wet cement paste prior to casting to create carbonic acid. The selection of the appropriate program for carbonation will depend upon each application's specific manufacturing and end requirements.

In most instances, and in particular when working with portland, lime or pozzolanic hydraulic cement, calcium hydroxide will be generated while the cement hydrates, thereby raising the pH above 7 even if it was initially (e.g. during the preparation of the cement slurry) carbonated. Accordingly, in all such instances the cured cement product again needs to be carbonated; e.g. by placing it in a pressurized carbon dioxide or other appropriate environment, to neutralize the calcium hydroxide and again lower the pH to about 7.

Cement may be carbonated by way of environmental carbonation; e.g. placing the cement or cement product in a carbon dioxide-containing atmosphere, and/or admixture carbonation (including foam blowing agents). Suitably controlled, either or a combination of these methods may be employed to satisfactorily reduce the pH of the cement to and maintain it at and/or again reduce it to neutral during and following the hydration of the cement.

In all cases a normal portland, lime or pozzolanic cement paste or mixture, combined with naturally occurring fibers and/or aggregates, certain plastics, such as polyester, and/or glass aggregates and/or fibrous or woven reinforcement, is exposed either to a high level of carbonic acid (carbon dioxide-saturated water) or damp carbon dioxide ($CO_2$+ $H_2O$). This reacts with calcium hydroxide [$Ca(OH)_2$] to form calcium carbonate and water:

$$Ca(OH)_2 + CO_2 \rightarrow CaCO_3 + H_2O$$

For mixtures of carbon monoxide and ozone gases, either of two alternative reaction pathways may be utilized. In the first instance, the carbon monoxide is reacted with the ozone to form carbon dioxide, molecular oxygen and thermal energy. The carbon dioxide is then reacted with the cement to carbonate it as in the foregoing example:

1. $CO + O_3 \rightarrow CO_2 + O_2$

2. $Ca(OH)_2 + CO_2 \rightarrow CaCO_3 + H_2O$

The second alternative is to react the carbon monoxide with the cement to form calcium carbonate and free molecular hydrogen and, next, to react the hydrogen and the ozone to produce Water, free molecular oxygen and thermal energy:

1. $Ca(OH)_2 + CO \rightarrow CaCO_3 + H_2$

2. $H_2 + O_3 \rightarrow H_2O + O_2$

The thermal energy produced by either of these reactions can be used to supplement the heat generated by conventional combustion pathways as, for example, the burning of fossil fuels to produce heat which in turn is used to generate electric power. As a result, increased efficiencies can be obtained which can result in reduced consumption of fossil fuels and, as a result, in reduced costs of production of electrical energy.

This invention permits the use of the method of carbonation (which is meant to include treatment of the cement with other appropriate materials such as CO or $O_3$, first reacted to form $CO_2$ and $O_2$, for example) most appropriate for the application and surrounding circumstances to reduce the pH to neutral (i.e. a pH of 7), thus eliminating the calcium hydroxide from the calcium-silicate-hydrate and precluding the opportunity for it to react with the naturally occurring fibers or fills, plastic or glass or blends of some or all of these to form silica gel or other undesirable compounds and permitting an unimpaired bond. For example, carbonation can be accomplished by gas entrainment or foaming, by mixing and casting and/or drying or autoclaving the cement or concrete in a $CO_2$ rich atmosphere, by introduction of carbonic acid (water and carbon dioxide) into the mix, and by immersing the set and/or cured cement or concrete product in carbonic acid, to eliminate any calcium hydroxide from the cured product and thereby permanently protect the reinforcements and aggregates from degradation, decomposition and/or inadequate bonding with the cement lattice.

Each of these affects the manufacturing process and end product differently. As a result, in most cases it is recommended to initially determine, in accordance with conventional modern manufacturing production engineering, which constitutes the most suitable carbonation program for a specific application.

During carbonation, three polymorphic forms of calcium carbonate may be produced. Aragonite and vaterite are unstable polymorphs and calcite is the stable form. To ensure propagation of calcite, the mix design should include enough finely ground calcite to nucleate the developing matrix. Other means, including the introduction of ionized metals, may also be used to preclude the formation of the unstable polymorphs.

The carbonation reaction is exothermic, resulting from the release of the energy required to calcine the limestone in the cement-making process. As the calcium hydroxide returns to calcium carbonate, roughly its original state, it releases the heat of its transformation as well as water. This heat promotes the generation of Aragonite and vaterite, which is undesirable. As a result, the carbonation process is preferably maintained at low temperatures, close to the freezing point of water, preferably in the range between about 0° C. and 10° C., with a temperature just above 0° C. being presently considered optimal. Tests have shown that less vaterite and Aragonite will be formed if very cold carbonic acid is used for carbonation. This can be achieved, for example, by dissolving dry ice (frozen, liquid carbon dioxide) in a water bath or by bubbling chilled carbon dioxide through very cold water, either method in close proximity to the material being carbonated.

In a typical carbonation procedure, portland, lime or pozzolanic cement is prepared as binder medium as called for by the mix design appropriate to the application. The mix or the final product may include aggregate and/or reinforcement made of normal, untreated glass, plastic or other alkali-intolerant materials or blends of materials. The product is molded or cast as desired and the cement binder is then carbonated to prevent reaction with the plastic or glass aggregate or reinforcement, to fill any small interstitial voids with fine, tightly packed calcite crystals and to reduce the portlandite in the transition phase surrounding the non-cementitious materials. Carbonation may also take place during mixing or molding by means of foaming or gas entrainment.

The following examples illustrate the effect which is achieved by treating the curing and cured cement with carbon dioxide.

EXAMPLE 1

| Mix Design: | |
| --- | --- |
| Type III Cement | 9 lbs. |
| Water | 3.6 lbs. |
| Glass Fiber | 1 oz. |
| (¾" chopped strand) | |
| (recommended range of fiber length 4μ–2") | |
| Foaming Agent | 1 fl. oz. |
| (protein based) | |
| Aqueous Foam | 1 gal. |
| (1:30 agent to water, expanded to 15:1) | |
| Gelling Agent | 2 oz. |
| (Methocel F4M) | |
| Calcite Powder | 3 oz. |
| Glass Fabric 6 Oz. | 2 layers |

Sample Preparation:

A single casting, ½" in thickness by 8" by 4", was prepared as a specimen and the chopped fiberglass strand reinforcement was added to the foamed cement slurry during mixing. The casting was reinforced on either side with a layer of 6 oz. fiberglass cloth saturated with cement slurry as is typical, for example, when making cement board. The gelling agent (hydroxypropyl methylcellulose) caused the mixture to become viscous to the point of behaving like a gel and retarded the set and subsequent hydration of the mixture. Because of the slow hydration the temperature of the casting did not measurably rise above ambient temperature. The first set occurred 38 hours after casting.

Three days after casting, the specimen was exposed to carbon dioxide gas in a controlled atmospheric chamber at 2° C. and 15 psi. Gas was created by means of dry ice in water in a container at the bottom of the chamber. After an exposure time of 22 hours the specimen was sawed into 8 samples each approximately 1' by 4" by ½".

Test for alkalinity was conducted by grinding a small section of the specimen and with it creating a slurry in a 1% phenolphthalein solution. No color change was observed, indicating a neutral pH (7).

Seven days after casting, the specimen was subjected to X-ray diffraction for chemical and crystalline analysis. Some of the cement was still incompletely hydrated, indicating that hydration was continuing. Scanning Electron Micrographs of specimen indicated the formation of calcite and not Aragonite or vaterite.

Twelve days after casting, the pH of the samples had risen to about 11. Thereafter one of the samples was used as a control sample and the other was subjected to carbonation at 2° C. and 15 psi as described above. About ½ gram of material from each sample was sawed off after 6 hours of carbonation. The test sample showed a pH of 7; the control, a pH of 11.

The test and control samples were then subjected to Scanning Electron Microscope analysis by sawing each into 0.5×3×3 cm squares. Scanning electron microscopy and electron diffraction spectrometry (EDS) indicated that no silica gel was formed in the test sample and that most or all crystals of calcium carbonate were calcite. No vaterite or Aragonite was seen or detected. The cured cement mix was uniformly and tightly bound around those individual fibers that were visible in the hydrated cement paste. There was peripheral bonding of crystals to the exterior fibers of individual yarn fragments (chopped strand) and in the yarns woven into the reinforcing cloth, but the individual fibers in the interior of these yarns were bound or attached to the calcite-calcium-silicate-hydrate only very rarely. In short, there was little penetration of hydration products into the yarns.

Scanning electron microscopy and EDS further indicated that a small amount of silica gel formed in the control sample's transition phases adjacent to the glass fiber surfaces. All crystals of calcium carbonate were calcite. No vaterite or Aragonite was seen or detected. The crystalline material of the cement showed some disorganization in the transition phase around the individual fibers that were introduced into the cement slurry. The disorganized phase appeared to be at least partly silica gel. In addition, there was peripheral bonding of the disorganized transition phase to the exterior fibers in the yarns comprising woven cloth, but there was little penetration into the yarn bundles and the fibers in the interior of the yarns were not bound or attached except very rarely to the calcite-silicate cement or to the disorganized portions of the transition phase material.

Forty-five days after casting, ½ gram was sawed off the test and control samples. The alkalinity test set forth above was repeated. The test sample had a pH 7 (neutral) and the control sample had a pH 11.

The foregoing analysis of the specimens demonstrates that following initial carbonation the pH rises again because as the hydration (cure) of unhydrated materials continues over time until complete, more calcium hydroxide is generated. Thus, to achieve permanent carbonation and resultant alkali neutralization of the sample, hydration (cure) must be complete.

The analysis also shows that carbonation in accordance with the invention prevents formation of silica gel around alkali sensitive admixtures, such as glass, and further results in the formation of calcite crystals rather than those of vaterite or Aragonite.

EXAMPLE 2

| Mix Design: | |
| --- | --- |
| Type III Cement | 3 lbs. |
| Water | 1 lb. |
| Nylon Fiber | 1/16 oz. |
| (.87", 2.5 denier fiber) | |
| (recommended range of lengths 4μ–2") | |
| Foaming Agent | ½ fl. oz. |
| (protein based) | |
| Aqueous Foam | 1.5 gal. |
| (1:30 by weight agent to water, expanded to 15:1) | |
| Super Plasticizer | ⅛ fl. oz. |
| (WRDA 19) | |
| Gelling Agent (Methocel F4M) | ⅓ oz. |
| Calcite Powder | 1 oz. |
| Glass Fabric | 2 ea. |

Sample Preparation:

A specimen was prepared and, after 3 days, exposed to $CO_2$ gas as in Example 1.

The specimen was sawed into 8 samples of approximately ½"×1"×4". A test for alkalinity showed the specimen to have a pH 7. Further testing of the specimen led to same results as for the specimen of Example 1.

EXAMPLE 3

| Mix Design: | |
| --- | --- |
| Type III Cement | 3 lbs. |
| Water | 1 lb. |
| Nylon Fiber | 1/16 oz. |
| (.87", 2.5 denier fiber) | |
| Foaming Agent | 1 fl. oz. |

-continued

| Mix Design: | |
|---|---|
| (protein based) Aqueous Foam (1:30 by weight agent to water, expanded to 15:1) | 3 gal. |
| Gelling Agent (Methocel F4M) | ⅓ oz. |
| Calcite Powder | 1 oz. |
| Glass Fabric | 2 ea. |

Sample preparation:

A specimen was prepared and, after 3 days, exposed to $CO_2$ gas as in Example 1. It was sawed into 8 samples of approximately ½"×1"×4". Test for alkalinity showed the specimen to have a pH 7. Further testing of the specimen led to same results as for the specimen of Example 1.

Since the reaction takes place between the calcium hydroxide and the carbon dioxide and/or carbon monoxide, the results in all cases will be similar, regardless of the source (such as industrial flues) of the carbon dioxide gas. Nonetheless, it is preferable to utilize industrial flue gases wherever possible for two reasons. First, this source of carbon dioxide gas is considered a pollutant which is being eliminated by the process of the present invention and, second, it is extremely cheap in comparison to separating the gas from compressed air taken from the atmosphere. Lower cost of gas collection makes the carbonation process more economical for production purposes.

Products made in accordance with the present invention will find application in many of the cement-based processes and products that now incorporate low-strength plastic fibers or coated fiberglass, such as in normal fiber-reinforced concretes or fiberglass-reinforced cement boards. Further, due to the lower cost of cement as compared to plastics and synthetic resins, this process permits the substitution of cements for resins and plastics used to make plastic or fiberglass reinforced polymer-based composites, such as aircraft and automotive parts and in building and structural components, such as bridge trusses and girders, consumer items and machinery.

By virtue of the present invention, many new products become feasible because they can now be made by blending fibers, aggregate and other materials incorporated into the cement mix to create final products having the required specific physical properties and behaviors. Thus, the fibers, aggregate and other materials may now, for the first time, include various combinations of natural fibers, glass fibers, plastic fibers and/or selected types of natural, glass, ceramic or plastic aggregates deliberately combined based upon their physical properties to meet specific service requirements, such as tensile strength, flexibility, impact resistance, compressive strength, ductility, shear strength, thermal, acoustic and/or electrical conductivity and hardness. Because the transition phases in these materials will contain little or no portlandite, the materials will form stronger bonds to aggregates and reinforcing fibers, textiles and other matrices. Because the pH of the carbonated cement is neutral, many materials heretofore not considered suitable for inclusion in mix designs can now be utilized and freely blended to achieve the desired characteristics, thereby greatly broadening the potential for the development of materials to meet specific design criteria. In the past this was not possible because many or most of the materials otherwise available for this purpose were attacked or degraded by the hydroxides in the cement and could therefore not be used.

It is particularly noteworthy that the present invention makes possible cement products with characteristics which heretofore were unattainable because of the severe limitations of the type and characteristics of fiber reinforcements and/or aggregates that could be mixed into the cement paste. With carbonation and resultant neutralization, almost any fiber and/or aggregate product can be mixed with the cement since the danger of decomposition of the reinforcing fibers is eliminated. Thus, fibers such as glass can be selected for their high tensile strength and others for flexibility (such as polyester) and combined (blended) to give the finished cement product characteristics combining the properties. Thus, cement products using specifically engineered combinations of fibers and/or reinforcing textiles or yarns can be produced to have a high degree of flexibility and tensile strength heretofore completely unattainable with cement products. Accordingly, without sacrificing desirable or necessary characteristics, the present invention makes it possible to substitute relatively low cost, easily shaped and molded cement products for products which heretofore were produced using expensive materials that were more difficult to form or machine. As a result, the present invention greatly enlarges the possible uses of hydraulic cement and products made therefrom.

What is claimed is:

1. A method of protecting alkali-intolerant material in a cured cement product comprising the steps of mixing dry cement, ground calcite, and an alkali-sensitive material, adding water to form a paste, molding the paste into a product, curing the product, exposing the cured product to carbon dioxide, and reducing the pH of the mixture to about 7 by generating calcium carbonate in calcite form.

2. A method according to claim 1 wherein the step of reducing the pH is at least in part performed after the step of curing has been substantially completed.

3. A method according to claim 2, wherein the step of reducing the pH is partially performed before the mixture has fully cured.

4. A method according to claim 1, wherein the step of reducing the pH is accomplished by adding $CO_2$.

5. A method according to claim 4, wherein the step of adding $CO_2$ is performed before the mixture has set.

6. A method according to claim 5, wherein the step of adding $CO_2$ comprises entraining $CO_2$ gas in the mixture.

7. A method according to claim 6, wherein the step of adding $CO_2$ comprises the step of injecting a foaming agent into the mixture, and foaming the foaming agent with a gas including $CO_2$ gas.

8. A method according to claim 7, including the step of varying the proportion of $CO_2$ gas in the foaming gas.

9. A method according to claim 4, wherein the step of adding $CO_2$ comprises the step of adding the $CO_2$ to the mixture after the mixture has set.

10. A method according to claim 9, wherein the step of adding $CO_2$ comprises the steps of immersing the mixture, after it has set, in a bath of carbonated water.

11. A method according to claim 1 wherein the step of reducing comprises adding to the mixture at least one material selected from the group consisting of CO and $CO_2$.

12. A method according to claim 4, wherein the step of adding $CO_2$ comprises placing the mixture in an atmosphere including $CO_2$ gas.

13. A method according to claim 12, including the step of raising the pressure of the atmosphere to above ambient pressure.

14. A method according to claim 13, wherein the atmosphere comprises predominantly $CO_2$ gas.

15. A method according to claim 14, including the step of cooling the mixture while adding the $CO_2$ gas.

16. A method according to claim 15, including the step of cooling the mixture to a temperature in the range of between about 0° C. and 10° C.

17. A method according to claim 16, wherein the step of cooling comprises the step of maintaining the mixture at a temperature above 0° C.

18. A method according to claim 4 wherein the $CO_2$ utilized is produced by reacting carbon monoxide and ozone to form carbon dioxide and oxygen.

19. A method according to claim 14 including the step of removing the oxygen produced during the reaction of carbon monoxide and ozone prior to the step of adding $CO_2$.

20. A method according to claim 1 wherein the step of reducing the pH is accomplished by reacting carbon monoxide with the mixture to form calcium carbonate and hydrogen.

21. A method according to claim 20 wherein the hydrogen reacts with ozone to produce water, oxygen, and thermal energy.

22. A method according to claim 18 including the step of separating the oxygen produced during the reaction of carbon monoxide and ozone.

23. A method according to claim 22 wherein the step of separating the oxygen further includes the step of utilizing the oxygen in a combustion process.

24. A method according to claim 20 wherein the flue gas from a combustion process is used as a source of carbon monoxide.

25. A method according to claim 24 wherein the source of ozone is from a combustion process.

26. A method of reinforcing cured cement mixtures with a material having alkali-intolerant or alkali-sensitive exterior surfaces comprising the steps of mixing at least cement, water, calcite and the material to form a paste, shaping the paste into a product, curing the product, exposing the cured product to carbon dioxide or carbon monoxide drying the product, and continuing the carbon dioxide exposing step until substantially all calcium hydroxide has reacted into calcite and the pH of the product is about 7.

27. A method according to claim 26, wherein the alkali sensitive material is a fiberglass filament.

28. A method according to claim 26 wherein the alkali sensitive material is a aggregate.

29. A method according to claim 26 wherein the material comprises at least one of fibers and aggregate at least some of which are made from different materials.

30. A method according to claim 26 wherein the step of exposing is performed after the product is fully cured.

31. A method according to claim 26 wherein the step of exposing comprises adding only $CO_2$ to the mixture.

32. A method according to claim 31 wherein the step of exposing is at least partially performed when calcium hydroxide is being formed to thereby reduce the pH of the mixture during curing to about 7.

33. A method of providing cured cement mixtures with material having alkali-intolerant exterior surfaces comprising the steps of mixing dry cement powder, ground calcite, and an alkali-sensitive material, adding water to form a paste, shaping the paste into a product, curing the product, exposing the product to a carbon dioxide atmosphere, and drying and repeating the carbon dioxide exposing step until substantially all calcium hydroxide has reacted into calcite and the pH of the product is reduced to about 7 as a result of converting calcium hydroxide which is present in the product into calcite.

34. A method according to claim 33 wherein the step of exposing includes the step of placing the product in a gas atmosphere of CO.

35. A method according to claim 33 including the step of pressurizing the atmosphere to above atmospheric pressure.

36. A method according to claim 35 including the step of cooling the product during the step of exposing it to the gas atmosphere.

37. A method according to claim 36 wherein the cooling step includes maintaining the product temperature in the range of between about 0° and 10° C.

38. A method according to claim 37 wherein the temperature is about 2° C.

39. A method according to claim 30 wherein the step of exposing comprises immersing the product in a bath including $CO_2$.

40. A method according to claim 33 wherein the step of exposing includes reacting the at least one of carbon dioxide and carbon monoxide with calcium hydroxides in the product to generate calcite.

41. A method according to claim 33 including the step of increasing a porosity of the product by foaming.

42. A method according to claim 41 wherein the step of increasing the porosity comprises the step of adding a foaming agent to the slurry.

43. A method according to claim 42 wherein the foam material is an aqueous foam.

44. A method of reinforcing cured cement mixtures with fibers having alkali-intolerant exterior fiber surfaces comprising the steps of mixing dry cement powder, ground calcite, and alkali-sensitive fibers and adding water to form a paste therewith, shaping the paste into a product, curing the product, exposing the cured product to carbon dioxide, drying and repeating the carbon dioxide exposing step until substantially all calcium hydroxide has reacted into calcite, the stable form of calcium carbonate, and reducing the pH of the product to about 7.

45. A method according to claim 44 wherein the step of combining and mixing includes adding fibers made of different materials.

46. A method of protecting alkali-intolerant material in a cured cement product against degradation of the material by calcium hydroxide comprising the steps of mixing dry cement powder, ground calcite, and alkali-sensitive materials and adding water to form a paste therewith, shaping the paste into a product, curing the product, exposing the cured product to a carbon dioxide atmosphere by using flue gases from a combustion process of at least one of CO and $CO_2$ and mixtures thereof, reacting at least one of CO and $CO_2$ with calcium hydroxide in the product to form calcium carbonate as substantially calcite in an amount sufficient to reduce the pH of the mixture to about 7, and continuing the exposing step until substantially all calcium hydroxide has reacted into calcite.

47. A method according to claim 46 wherein the step of exposing is at least partially performed after the product has fully cured.

48. A method according to claim 46 wherein the step of exposing includes the step of generating heat.

49. A method according to claim 46 wherein the step of exposing includes cooling the temperature of the product to no more than about 10° C.

50. A cured cement product comprising at least cement, a filler, and material distributed throughout the product which has alkali-intolerant exterior surfaces in contact with a remainder of the product, the product including calcium carbonate in the form of substantially calcite, having a pH of about 7 and made by mixing dry cement powder, ground calcite, and an alkali-sensitive material and adding water to form a paste therewith, shaping the paste into the product, curing the product, and exposing the cured product to carbon dioxide until substantially all calcium hydroxide has reacted into calcite.

51. A product according to claim 50, wherein the alkali sensitive material is uncoated fibers.

52. A product according to claim 51, wherein the fibers are glass.

53. A product according to claim 51, wherein the fibers are plastic fibers.

54. A product according to claim 50, wherein the material is an uncoated aggregate made of alkali-intolerant material.

55. A product according to claim 50, wherein the alkali sensitive material is a a cloth.

56. A product according to claim 50, wherein the alkali sensitive material is a roving.

57. A product according to claim 50, wherein the alkali sensitive material is glass fibers, and wherein the product is a glass fiber reinforced cement board.

58. A cured cement product comprising at least cement including calcium carbonate in the form of calcite and at least one of fibers and aggregate distributed throughout the product and having alkali-intolerant exterior surfaces in contact with a remainder of the product, some of the at least one of the fibers and the aggregate being made from a different material than others of the at least one of the fibers and the aggregate, the product being made by mixing dry cement powder, ground calcite, and an alkali-sensitive material and adding water to form a paste therewith, shaping the paste into the product, curing the product, and exposing the cured product to carbon dioxide until substantially all calcium hydroxide has reacted into calcite and having a pH about 7.

* * * * *